April 12, 1938.  J. A. JOHNSON  2,113,592
APPARATUS FOR ASSEMBLING SEALING PADS IN RECEPTACLE CLOSURE CAPS
Filed Dec. 24, 1934  9 Sheets-Sheet 1

Fig. 1

INVENTOR
J. A. JOHNSON
BY John A. Seyfert
ATTORNEY

April 12, 1938.  J. A. JOHNSON  2,113,592
APPARATUS FOR ASSEMBLING SEALING PADS IN RECEPTACLE CLOSURE CAPS
Filed Dec. 24, 1934  9 Sheets-Sheet 2

April 12, 1938. J. A. JOHNSON 2,113,592
APPARATUS FOR ASSEMBLING SEALING PADS IN RECEPTACLE CLOSURE CAPS
Filed Dec. 24, 1934 9 Sheets-Sheet 6

INVENTOR
J. A. JOHNSON
BY John A. Seifert
ATTORNEY

April 12, 1938.   J. A. JOHNSON   2,113,592
APPARATUS FOR ASSEMBLING SEALING PADS IN RECEPTACLE CLOSURE CAPS
Filed Dec. 24, 1934   9 Sheets-Sheet 8

INVENTOR
J. A. JOHNSON
BY John A. Seyfert
ATTORNEY

Patented Apr. 12, 1938

2,113,592

UNITED STATES PATENT OFFICE 2,113,592

APPARATUS FOR ASSEMBLING SEALING PADS IN RECEPTACLE CLOSURE CAPS

John A. Johnson, Woodhaven, N. Y.

Application December 24, 1934, Serial No. 759,057

21 Claims. (Cl. 113—80)

This invention relates to apparatus for permanently assembling sealing pads or disks in receptacle closure caps, particularly of the type known as "crown caps" formed from sheets of metal by a die press capable of producing approximately thirty-four thousand caps per hour and requiring the use of two of the present type of apparatus now in commercial use to assemble sealing pads in all of the caps produced by the die press, and it is the primary object of the present invention to provide improved apparatus of increased capacity that will assemble sealing pads in the entire production of caps formed by one of said die presses.

Another object of the invention is to provide an apparatus compact in size without reducing the efficiency of operation thereof by causing the closure caps to travel in a path of a figure 8 during the assembling of the sealing pads in the closure caps.

A further object of the invention is to effect the continuous assembling of sealing pads in closure caps by providing means to simultaneously feed closure caps and sealing pads to the apparatus and assemble the pads in the caps during the continuous travel of the caps.

A still further object of the invention is to provide inexpensive and positive operating means to supply and evenly spread a film of adhesive over the inner surface of the closure caps to assure adhesion of the sealing pads to the closure caps.

It is another object of the invention to provide means normally actuated to positively grip and prevent the feeding of sealing pads to means to deliver sealing pads to the closure caps and adapted to be actuated by the travel of the closure caps toward the sealing pad delivering means to permit feeding of sealing pads to said sealing pad delivering means.

It is a further object of the invention to provide means to position sealing pads in alinement with continuously traveling closure caps having viscid adhesive therein and deliver said alined sealing pads in contact with the adhesive in the traveling closure caps.

It is a still further object of the invention to provide an annulus to support and transport closure caps rotatably mounted on a series of equidistantly spaced anti-friction bearings to greatly reduce frictional resistance and the amount of power required to rotate said annulus.

Further objects and advantages of the invention will hereinafter appear.

The embodiment of the invention illustrated in the accompanying drawings comprises a continuously rotatable annulus arranged with a series of cap supporting pockets about the periphery thereof traveling adjacent to a continuously revolving disk adapted to receive closure caps from a hopper chute and transfer the caps to position in alinement with the cap supporting pockets. Reciprocating means engage and move the alined closure caps from the revolving disk into the cap supporting pockets to be transported by the annulus to means reciprocatory toward and away from the annulus arranged with means to supply adhesive in caps on the annulus. The caps having the adhesive therein are passed through a zone of elevated temperature of sufficient length to render the adhesive viscous and freed of all foreign substances, and said zone terminating adjacent to a continuously rotating disk having a peripheral portion superposed to and traveling relative to a portion of the annulus to present sealing pad supporting portions thereof in alinement with the closure cap supporting pockets. The sealing pads are fed from a stack in a tube to the sealing pad supporting portions of the disk by a slide actuated in synchronism with the means for engaging closure caps in the cap supporting pockets and the absence of a closure cap in a cap supporting pocket positioned in predetermined relation to the sealing pad supporting disk will actuate means to hold and prevent sealing pads from leaving the stacking tube and being fed to the sealing pad supporting disk to be delivered to said empty pocket in the annulus. The sealing pad supporting disk is arranged with a series of plungers in alined and spaced relation to the sealing pads supported by said disk adapted to be actuated to deliver the sealing pads into contact with the viscid adhesive in the caps in the supporting pockets of the annulus. Closure caps with the sealing pads therein are positioned by the annulus onto a table rotatable in synchronism with the rotation of the annulus and having a series of spring influenced plungers actuated to engage the sealing pads in the closure caps positioned on the table to maintain said closure caps on the table and disengage them from the pockets of the annulus by the rotation of the table. The plungers of the table place the engaged sealing pads under pressure to cause the pads to adhere intimately to the closure caps during the cooling thereof and before the completion of a revolution of the table the pressure applying plungers are disengaged from the caps to permit the caps to be transferred from the table to another rotating table to discharge the assembled closure caps from the apparatus and place the pressure applying table in condition to receive closure caps having sealing pads therein from the annulus.

In the drawings accompanying and forming a part of this application

Figure 2:
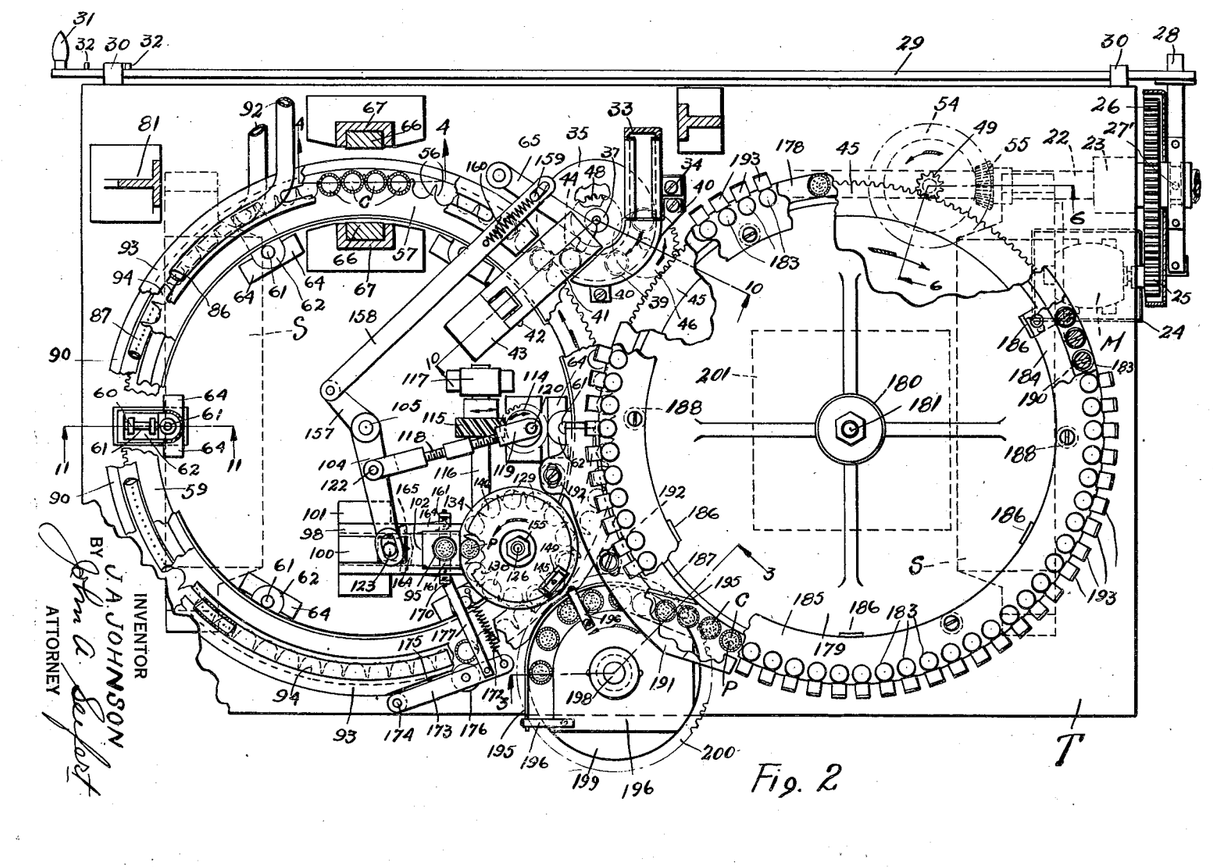
Figure 2 is a view looking at the top of Figure 1.

In carrying out the embodiment of the invention illustrated in the drawings, the operative mechanism is supported upon a table T mounted adjacent the opposite ends upon standards S, and is actuated from a drive shaft 22 rotatable in hanger bearings 23 suspended from the table T, and driven from a suitable source of power, such as an electric motor M supported by a shelf 24 fixed to a standard S, the motor being releasably connected to the drive shaft through a pinion 25 fixedly engaged on the shaft of the motor meshing with a gear 26 loosely mounted on the drive shaft and adapted to be connected to the shaft by a friction clutch, as indicated at 27', arranged with a shifter 28 pivoted at one end to an extension of the shelf 24 and loosely connected at the opposite end to one end of a bar 29 slidable in brackets 30 fixed to a side of the table T and actuated by a hand grip 31 on the end of the bar opposite to the end connected to the shifter 28, the movement of the bar being limited by pins 32 fixed in the bar at opposite sides of a bracket 30, as shown in Figure 2.

Figure 10:
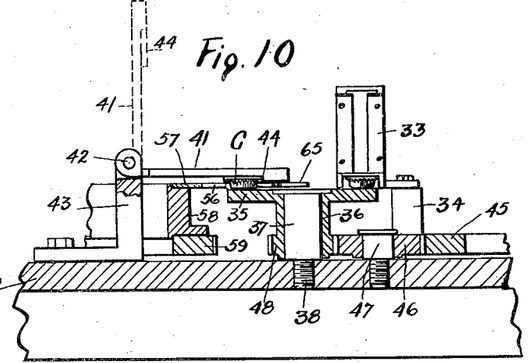
Figure 10 is a sectional view, on an enlarged scale, taken substantially on the line 10—10 of Figure 2 looking in the direction of the arrows, of the disk to receive the caps from the hopper chute and transfer the closure caps to the annulus and the means to engage the closure caps into the pockets of the annulus.

The closure caps C of the crown type having an outwardly flaring skirt portion are fed from a hopper, not shown, but of a type as disclosed in my co-pending application Serial No. 724,689, filed May 9, 1934, by a chute 33, only the lower outlet end of which is shown (Figures 2 and 10) supported from the table T by a post 34 to extend in superposed relation to a disk 35 arranged with an elongated sleeve 36 centrally thereof rotatably engaged on a bearing 37 fixed in the table T, as by screw threading, as indicated at 38 in Figure 10. The disk 35 is continuously rotated in a direction away from the outlet end of the chute to transport the closure caps delivered thereto in a circular path under an arcuate guide plate 39 mounted by posts on the table T, as at 40 in Figure 2, to extend in spaced superposed relation to a peripheral portion of the disk 35 commencing at the outlet end of the chute and terminating at an adjustable rectangular guide plate 41 having one end bifurcated with the legs of the bifurcation pivotally connected by a pin 42 to a bracket 43 fixed to the top of the table T, the pivotal mounting permitting the adjustment of the guide plate toward and away from the disk 35 and supporting the plate to extend in parallel spaced relation to the disk, with the undersurface of the plate 41 at the end opposite to the bifurcated end extending below the surface of the remaining portion of the plate and arranged to form a curved ridge to engage and arrest the movement of the caps on the disk 35, as at 44 in Figures 2 and 10. The disk 35 is actuated from the drive shaft 22 through an annular gear 45 rotatably mounted on the table T, which mounting will be more fully described hereinafter, meshing with a pinion 46 rotatable on a bearing stud 47 fixed in the table and meshing with a gear 48 on the sleeve 36, the annular gear 45 being driven from the drive shaft 22 by a pinion 49 meshing with the annular gear and fixed to one end of a shaft 50 rotatably supported by roller bearings, as at 51 in Figure 6, in a cylindrical casing 52 releasably mounted in an opening in the table T by bolts engaged in a flange of the casing and the table, as at 53, with a bevel gear 54 fixed on the end of the shaft 50 opposite to the end having the pinion 49 meshing with a bevel pinion 55 fixed on the drive shaft 22.

The closure cap on the disk 35 engaged by the curved ridge 44 of the guide plate 41 is transferred from the disk into an arcuate recess or pocket of a series of equidistantly spaced recesses or pockets 56 arranged in the outer periphery of an annular plate 57 secured at the inner peripheral portion to an annulus or ring member 58 having a lateral flange at the lower portion thereof juxtaposed and connected to an annular gear 59, the annulus 58 and gear 59 being rotatably supported by anti-friction bearings, such as pairs of roller bearings, each pair extending at a right angle to each other and comprising spaced roller bearings 60 rotatably mounted on a shaft 61 fixedly supported by a right angle bracket 62 having recesses in the leg portions thereof to permit free rotation of the roller bearings, as at 63, with the leg portion supporting the bearings for the gear 59 extending horizontally and mounted in an opening in the table T by flanges projecting laterally from opposite sides of the leg portion to engage the portions of the table on the opposite sides of the opening, as at 64 in Figure 2. The annular plate 57, annulus 58 and gear 59 are supported with a minimum of friction by equidistantly spacing a plurality of the bearing supporting brackets 62, in the present instance six brackets are provided, but the number of brackets will vary correspondingly to the diameter of the annular members. The arcuate recesses for supporting the closure caps are continuously moved past the disk 35 by the rotation of the annular plate 57 through the annular gear 59 meshing with and driven by the annular gear 45 at a point in alinement with the axes of said gears.

The closure cap abutting the curved ridge 44 is transferred from the disk 35 into a recess or pocket 56 passing in alinement with said closure cap by a reciprocating arm 65 pivotally mounted at one end on the table T with the opposite end arranged as a finger to travel in an arc between the disk 35 and guide plate 41 to engage the closure cap abutting the curved ridge of the guide plate and transfer said closure cap into the alined recess 56. The arm 65 is reciprocated in timed sequence to the travel of the recesses 56 to deliver a cap into a recess and be moved out of the path of the next succeeding closure cap on the disk to permit said succeeding cap to abut the curved ridge 44 and be delivered to the next succeeding recess by the subsequent forward movement of the arm.

Figures 3, 4, 5:
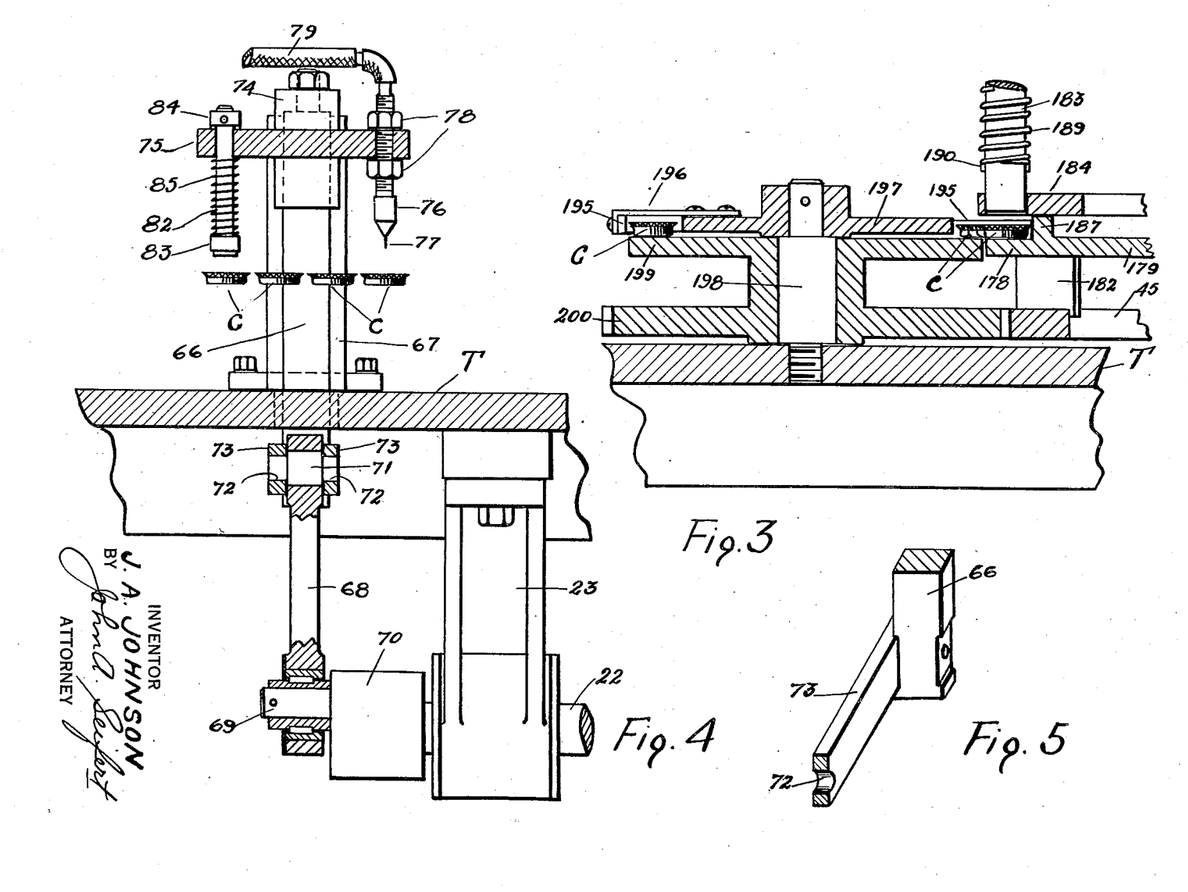
Figure 3 is a sectional view, on an enlarged scale, taken substantially on the line 3—3 of Figure 2 looking in the direction of the arrows, showing assembled closure caps being transferred from the pressure applying table to the table for discharging said closure caps from the apparatus.
Figure 4 is a sectional view, on an enlarged scale, taken substantially on the line 4—4 of Figure 2 looking in the direction of the arrows, of means to supply and spread fluid adhesive in the caps.
Figure 5 is a fragmentary perspective view of a link connection between a drive shaft and the adhesive supplying and spreading means shown in Figure 4.

After the closure caps have been engaged in the arcuate recesses 56, the caps are transported by the rotation of the annular plate 57 relative to means to supply and spread a fluid adhesive in the caps during the continuous travel of the caps, comprising a pair of slides 66 operatively mounted in a pair of opposed slideways 67 mounted on the table T on opposite sides of the annular plate 57, the slides being reciprocated from the drive shaft 22 by a crank arm 68 rotatably engaged at one end on a stud 69 fixed eccentrically in and projecting from a head 70 fixed on the free end of the drive shaft, the opposite end of the arm being arranged with a transverse pin 71 having reduced ends extending from the opposite sides of the arm which engage aligned openings 72 intermediate the ends of a pair of opposed lever bars or links 73 having the opposite ends fixed to the opposite sides of the lower ends of the slides, as clearly shown in Figures 4 and 5. The upper ends of the slides 66 are connected by a head 74 extending transversely of the travel of the closure caps on the plate 57, said head having a transverse member 75 of an extent to position openings in the opposite end portions thereof in vertical alinement with spaced closure cap supporting recesses 56, in the present instance the recesses in alinement with said openings are separated by two recesses as diagrammatically shown by the closure caps in Figure 4. The forward opening in the transverse head member 75 relative to the travel of the closure caps on the plate 57 is adapted to carry a discharge nozzle 76 having a plunger type of control valve 77 adapted to be opened by an upward movement of the plunger, the nozzle being adjustably retained in the opening in the transverse head member 75 by nuts threaded on a screw threaded shank of the nozzle to abut opposite surfaces of said transverse member, as at 78, and the upper end of said shank connected by a flexible tubing 79 to receive by gravity fluid adhesive from a tank 80, partly shown in Figure 1, supported from the table by a standard 81. During the downward movement of the slides 66 a spot of adhesive is deposited in a closure cap supported in a recess 56 in alinement with the adhesive discharge nozzle by the valve 77 engaging the closure cap and actuated to open position by the continued downward movement of the slides. The closure cap having a spot of adhesive therein is positioned by the travel of the closure cap transporting plate 57 in alinement with a plunger 82 slidably mounted in the opening in the transverse head member 75 opposite to the opening engaged by the nozzle 76, said plunger having a head 83 at the lower end to be engaged in the closure cap to spread the adhesive therein. A collar 84 is releasably mounted on the upper end of the plunger to abut the upper surface of the member 75 and retain the plunger in said member with a spring 85 coiled about the plunger between the lower surface of the member 75 and the head 83 whereby the adhesive is spread in the closure cap by yielding pressure during the downward movement of the slides 66 and simultaneously with the depositing of a spot of adhesive in a succeeding closure cap on the annular plate 57.

Figure 1:
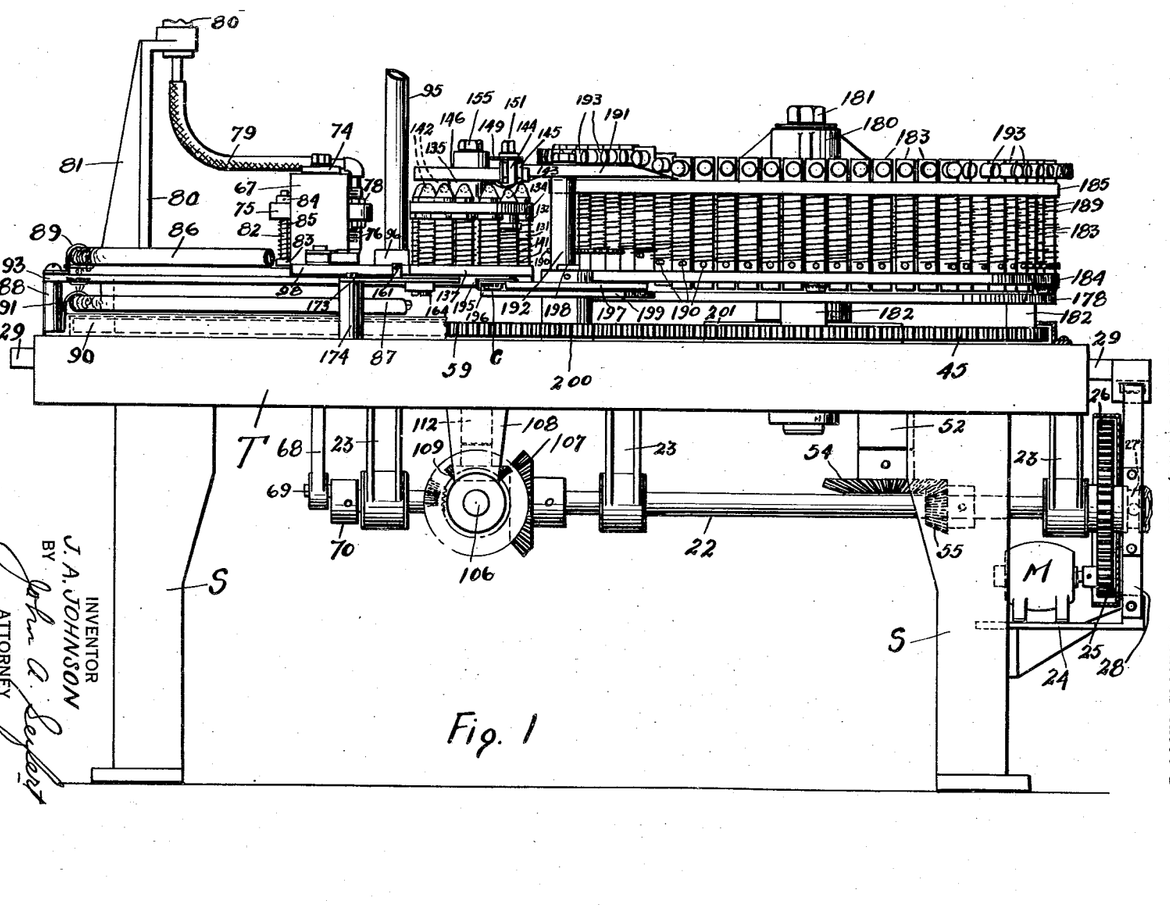
Figure 1 is an elevational view of the apparatus embodying the invention.
Figure 11:
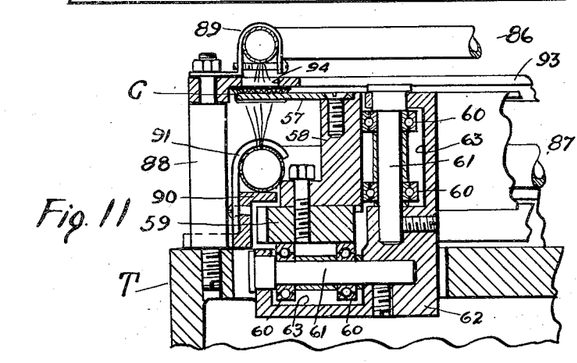
Figure 11 is a cross sectional view, on an enlarged scale, taken on the line 11—11 of Figure 2 looking in the direction of the arrows and showing gas heaters to create the zone of elevated temperature, and anti-friction bearing support for the annulus.

The closure caps with adhesive spread therein are passed through a zone having an elevated temperature to render the adhesive viscous and destroy foreign substances in the adhesive, such as alcohol, by evaporation and burning. The zone of elevated temperature is created by a pair of gas burners comprising pipes 86, 87 extending in an arc corresponding to the curvature of the closure cap supporting plate 57, the pipe 86 being supported from the table T above the line of travel of the closure caps on plate 57 by a plurality of posts 88 fixed in the table and U-clamping brackets 89 carried at one leg portion by the posts and releasably engaging and supporting the pipe 86, as shown in Figure 11. The pipe 87 is supported below the line of travel of the closure caps on the plate 57 on an annular guard rail 90 mounted on the table T to enclose the teeth of the annular gear 59, and clamped to said guard rail by a plurality of clamps 91 secured to the side of the guard rail. The burner pipes 86, 87 are connected to a source of gas supply at the ends adjacent the slides 66, as at 92 in Figure 2, with the opposite ends terminating approximately diametrically opposite the gas inlet ends of the pipes and closed by suitable plugs. The pipes 86, 87 are arranged with a series of alined holes in opposed relation to the closure cap supporting recesses 56 to direct the gas flame into and at the bottom of the closure caps in said recesses, as shown in Figures 1, 2 and 11.

The closure caps C are maintained in the recesses 56 of the plate 57 by an arcuate guide rail 93 secured to the posts 88 to extend horizontally between the closure caps in the recesses and the burner pipe 86, said guide rail having a longitudinal slot 94 to permit the flame from the burner pipe 86 to enter the caps and an inspection of the closure caps during their travel.

Figure 17:
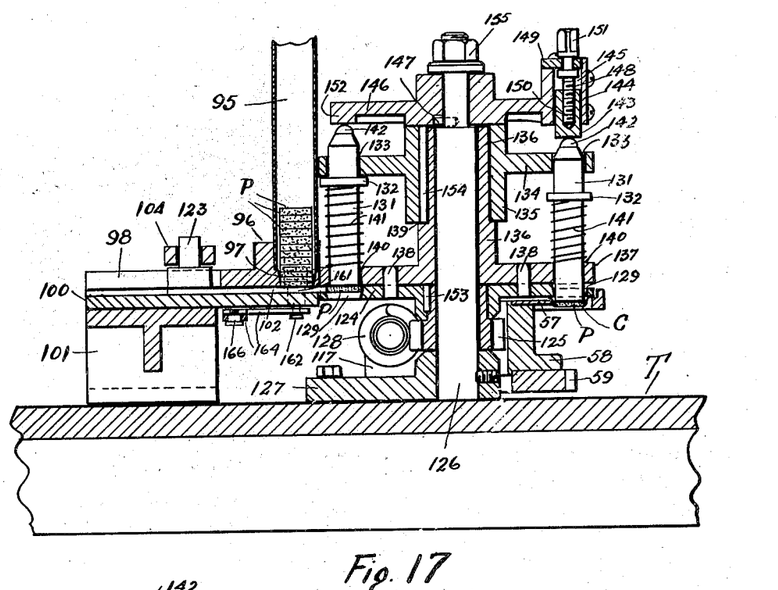
Figure 17 is a sectional view taken substantially on the line 17—17 of Figure 12 looking in the direction of the arrows showing the slide feeding a sealing pad to the sealing pad supporting disk and a plunger of the sealing pad supporting disk delivering a sealing pad to a closure cap in an annulus pocket.
Figure 18:
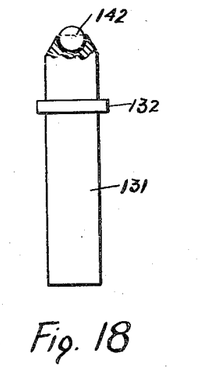
Figure 18 is a view of a plunger of the sealing pad supporting disk with a portion broken away to show the mounting of a ball to engage and travel relative to a cam to actuate the plungers.
Figures 19, 20, 21:
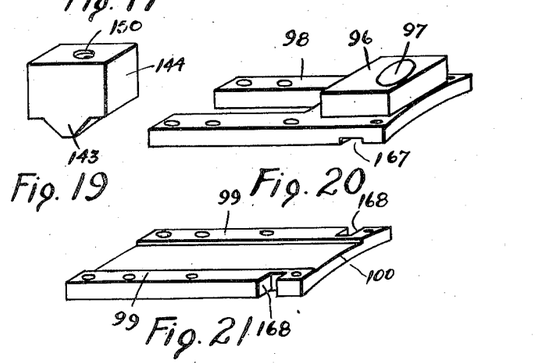
Figure 19 is a perspective view of the cam to actuate the plungers to deliver sealing pads into the closure caps.
Figure 20 is a perspective view of the upper portion of a shelf to support the sealing pad stacking tube.
Figure 21 is a perspective view of the lower portion of the shelf shown in Figure 20 forming a slideway for the sealing pad feeding slide.

When the closure caps leave the zone of elevated temperature a sealing pad or disk P of comminuted cork or other suitable material, is delivered to said closure caps having viscous adhesive therein from the bottom of a stack of such pads in a delivery tube 95 connected at the upper end in communication with a sealing pad supply hopper, not shown, but which may be of a structure similar to that disclosed in my co-pending application Serial No. 711,308, filed February 15, 1934, the lower end of the delivery tube 95 being supported and engaged in a boss 96 in alinement with a downwardly tapering opening 97 in a shelf formed by a bifurcated plate 98 having the opening 97 in the connecting portion of the bifurcation and mounted on raised longitudinal edge portions 99 of a plate 100 fixed to a stand 101 mounted on the table T (Figure 17). The lowermost sealing pad in the tube 95 engages and is supported on a portion of the plate 100 between the longitudinal edge portions 99, and said sealing pad supporting portion of the plate forming a slideway with the plate 98 for supporting a slide 102 having one end of reduced width slightly larger than the diameter of the sealing pads arranged with a slight arcuate indention to centrally engage the pads, as at 103 in Figures 12 and 14. The slide 102 is reciprocated transversely of the opening 97 between the plates 98, 100 by an arm 104 fixedly engaged on a spindle 105 rotatably mounted on the table T, and actuated from the drive shaft 22 through a transverse shaft 106 connected to the drive shaft by meshing beveled pinions, as at 107, and rotatably mounted in hangers 108 suspended from the table T. The shaft 106 is connected by beveled pinions 109 to a vertical shaft 110 rotatably mounted by antifriction bearings, shown as roller bearings 111, in a tubular member 112 supported in an opening in the table T by an annular flange, as at 113 in Figure 9. The end of the shaft 110 opposite to the end connected to the shaft 106 extends above the table T arranged with an oblique toothed gear 114 meshing with a similarly toothed gear 115 fixed to a shaft 116 rotatably supported in bearings 117 mounted on the table T. The shaft 110 is connected to the arm 104 by a link comprising a screw threaded shank 118 having adjustably mounted on one end a member 119 arranged at the free end with a boss carrying ball bearings to rotatably support the link on a stud fixed in and extended eccentrically from the gear 114, as at 120 in Figure 9, whereby reciprocatory movement is imparted to the link by the rotation of the shaft 110. The end of the link shank 118 opposite to the member 119 adjustably carries a bifurcated member 121 with the legs of the bifurcation pivotally connected to the arm 104 intermediate the ends thereof, as at 122. The free end of the arm 104 is reciprocated by the shaft 110 longitudinally of the slide 102 and arranged with an elongated opening slidably engaging a pin fixed in and projecting from a block secured on the slide 102 at the end opposite to the sealing pad engaging end 103, as at 123, the block supporting the free end of the arm and slidable between the bifurcation legs of plate 98 to facilitate the actuation of the slide.

The sealing pads are fed from the delivery tube 95 by the slide 102 to means to continuously position a sealing pad in superposed alinement with a closure cap in a cap supporting recess 56, said means comprising a disk 124 having a center flanged opening engaging and fixed by a key 153 to a worm wheel 125 rotatably mounted on a spindle 126 fixedly supported in a plate 127 arranged with a pair of the bearings 117 for the shaft 116 and mounted on the table T with the worm wheel meshing with a worm 128 fixed on the shaft 116 between the bearings 117 on the plate 127 to impart rotation to the disk 124 from the drive shaft 22 in a direction similar to the direction of rotation of the cap transporting plate 57, as indicated by the arrows to be anticlockwise. The disk 124 is mounted on the spindle 126 with a peripheral portion in superposed spaced relation to the annular plate 57 to successively position an opening of an annular series of equidistantly spaced and downwardly tapering openings or orifices 129 in the disk into vertical alinement with succeeding closure cap supporting recesses 56 of the plate 57. The disk 124 is rotated in synchronism with the reciprocation of the sealing pad delivering slide 102 so that the slide will deliver a sealing pad on the disk in alinement or register with an opening 129 and to insure proper positioning of the sealing pads the upper face of the disk 124 is arranged with a series of arcuate recesses 130 extending about the inner periphery of the openings 129 and facing the periphery of the disk to be engaged by the forward edge of the sealing pads as they are delivered on the disk from the plate 100 and position said sealing pads in register with the openings 129, the taper of said openings preventing the sealing pads from passing therethrough. The space between the disk 124 and plate 57 is such as to permit passage of the flared skirt of the closure caps, as clearly shown in Figure 17, during the travel of the caps on the plate 57.

By the continuous rotation of the disk 124 the sealing pads P are transported from the slide 102 to a position in momentarily vertical alinement with succeeding closure cap supporting recesses 56 and in such position each sealing pad is delivered into an alined closure cap by one plunger of a series of plungers 131 having an annular collar 132 adjacent one end with said end of the plungers slidably mounted in an opening of an annular series of openings 133 in a disk 134 having an elongated hub 135 slidably engaged on and fixed by a key 154 to rotate with a tubular extension 136 of another disk 137 rotatably mounted on the spindle 126 and supported by and connected to the sealing pad supporting disk 124 by pegs 138, the disk 134 being maintained in spaced relation to the disk 137 by the lower end of the hub 135 abutting a shoulder on the tubular extension 136, as at 139 in Figure 17. The ends of the plungers 131 opposite to the ends mounted in the disk 134 slidably engage openings 140 in the disk 137 in alinement with the openings 129 in the disk 124 and the openings 133 in the disk 134, and said ends of the plungers are normally maintained within the openings 140 to permit the slide 102 to deliver a sealing pad in register with an opening 129 in the disk 124, as shown in Figure 17, by a spring 141 coiled about each plunger between the collar 132 and disk 137, the movement of the plungers from the disk 137 being limited by the collars 132 abutting the disk 134. The lower ends of the plungers are maintained within the openings 140 during the rotation of the disks 124, 134 and 137 until the sealing pad in an opening 129 in disk 124 is momentarily in alinement with a closure cap in a recess 56 in the annular plate 57 when the plunger traveling with said sealing pad is rapidly actuated from the disk 137 into engagement with the pad in the opening 129 moving said pad from the disk 124 into the alined cap in contact with the viscous adhesive therein by a bearing ball 142 rotatably mounted in a socket in the end of each plunger extending above the disk 134 to engage an angular cam 143 arranged on the lower face of a block 144 slidably mounted in a vertical slideway 145 in the periphery of an annular plate 146 fixedly mounted on a reduced portion of the spindle 126 by a horizontally extending pin as at 147 in Figure 17. The cam block 144 is adjustably supported in the slideway 145 by a lead screw 148 loosely mounted in a plate 149 secured to and spanning the upper end of the slideway, and screw threaded in an elongated screw threaded bore 150 in the block whereby the turning of the lead screw by a manipulating head 151 extending from the screw above the plate 149 will raise or lower the cam block in the slideway and vary the length of movement of the plungers to adapt the apparatus for sealing pads of different thicknesses and assure the positioning of the sealing pad into contact with the viscous adhesive in the closure cap by the plungers 131. The plate 146 is arranged with a ridge 152 extending on the undersurface and about the periphery thereof (Figure 17) adapted to be engaged by the balls 142 of the plungers 131 in their travel to and away from the cam 143, said engagement between the balls and ridge further limiting the upward movement of the plungers under the influence of the springs 141 and maintaining the plungers within disk 137 before and after the plungers are actuated by the cam 143. The plate 146 is supported on the spindle 126 by the shoulder formed by the reduced end thereof and retained on the spindle by a nut and washer, as at 155.

The diameter of the openings 129 at the lower ends thereof is slightly less than the diameter of the sealing pads, and therefore, the taper of the openings 129 in the sealing pad supporting disk 124 in addition to maintaining the sealing pads in said openings will form the sealing pads to convex shape when the sealing pads are moved through the disk 124 by the plungers 131, which convexing of the sealing pads will facilitate the engaging of the sealing pads by said plungers 131 into the closure caps.

Figure 12:
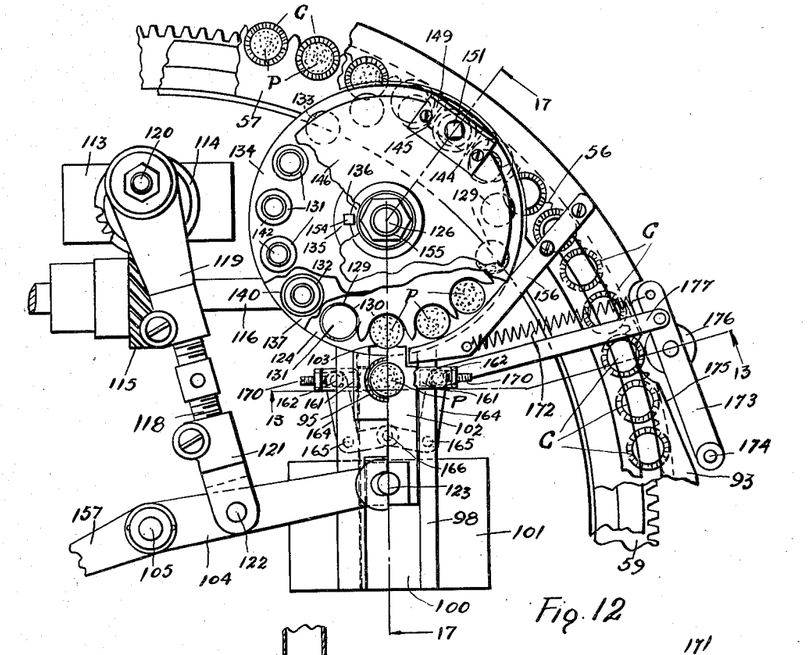
Figure 12 is a plan view of the sealing pad supporting disk with portions thereof broken away to show the structure thereof, and a pair of jaws normally engaging and maintaining the stack of sealing pads in the tube and actuated by the travel of closure caps with the annulus to permit feeding of the sealing pads from the stack to the disk.

The sealing pads are maintained in the recesses 130 of the pad supporting disk during the travel of the sealing pad from the pad delivering slide 102 to the cam 143 by a guide rail 156 mounted at one end on the guide rail 93 with the opposite end portion of arcuate formation corresponding to the curvature of the path of travel of the sealing pads and terminating adjacent the reduced end of the slide 102, as clearly shown in Figure 12.

The arm 65 for transferring the closure caps from the feeding disk 35 to the closure cap supporting recesses 56 of the annular plate 57 is reciprocated in synchronism with the actuation of the sealing pad feeding slide 102 by being actuated from the shaft 110 through the link 118 and arm 104 by an arm 157 fixed at one end to the spindle 105 and the opposite end pivotally connected to one end of a link 158 having the other end slotted to loosely engage a pin fixed in and projecting from the arm 65, as at 159 in Figure 2, with the pin yieldingly urged into engagement with the inner end of the slot by a spring 160 anchored at one end on the link 158 and fixed at the opposite end to said pin to prevent damage to the operative parts of the apparatus should the closure caps become jammed on the disk 35.

Figures 13, 14, 15, 16:
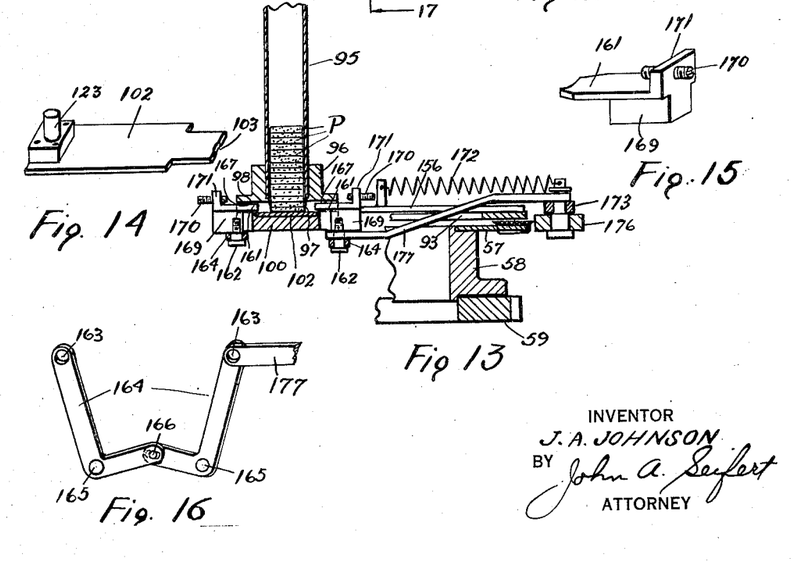
Figure 13 is a sectional view taken on the line 13—13 of Figure 12 looking in the direction of the arrows to show the pair of jaws actuated by a cap transported by the annulus to permit feeding of sealing pads to the sealing pad supporting disk.
Figure 14 is a perspective view of the slide to feed sealing pads from the stack in the tube to the sealing pad supporting disk.
Figure 15 is a perspective view of one of the pair of sealing pad engaging jaws.
Figure 16 is a perspective view of toggle levers for carrying the pair of sealing pad engaging jaws.

To prevent the waste of sealing pads P and interference with the actuation of the closure cap transporting plate 57 by the delivery of a sealing pad to an empty closure cap supporting recess 56 there is provided means normally engaging and preventing the sealing pads from leaving the delivery tube 95 comprising a pair of jaws 161 having opposed arcuate faces for engaging opposite edge portions of sealing pads in the opening 97 and the slideway of plates 98, 100, and releasably mounted by shoulder-screws 162 loosely engaged in perforations 163 in the ends of a toggle-joint formed by a pair of bell crank levers 164 pivotally supported on the under surface of the slideway plate 100 at the opposite longitudinal edges thereof, as at 165, with the opposite ends of the levers connected by a pin engaged in slots in said lever ends, as at 166 in Figure 16, to permit a force applied to the jaw end of one lever to be readily transmitted to the jaw end of the other lever. The mounting of the levers 164 at 165 will permit the jaws to slidably move in a channel 167 in the undersurface of the slideway plate 98 extending transversely of and in communication with opposite portions of the opening 97 and in register with notches 168 in the longitudinal edge portions 99 of the slideway plate 100 for the engagement of a block portion 169 of the jaws to permit movement of the jaws toward each other to engage the sealing pads. The movement of the jaws toward each other is adustably limited to adapt the apparatus for sealing pads and closure caps of different diameters by set-screws 170 screw threaded in vertical ears 171 extending from the rear of the jaws, as clearly shown in Figures 13 and 15, the inner ends of the set screws being adapted to abut the opposite longitudinal edges of the slideway plate above the channel 167, thereby limiting the forward movement of the jaws toward the sealing pads. The sealing pad engaging portion of the jaws 161 is of such a thickness as to permit movement of the jaws above the sealing pad delivering slide 102, as shown in Figure 13, whereby the feeding of a sealing pad to the disk 124 will not interfere with the operation of the jaws to stop the further discharge of sealing pads from the tube 95. The jaws are yieldingly urged to engage the sealing pads and adapted to be actuated away from the sealing pads by a closure cap in a supporting recess 56 that will be positioned by the rotation of the annular plate 57 and disk 124 in vertical alinement below the opening 129 and recess 130 of said sealing pad transporting disk 124 which are in alinement with the sealing pad feeding slide 102 to receive a sealing pad therefrom when the jaws are being actuated away from the sealing pads by said cap. The mechanism for accomplishing this purpose comprises a spring 172 anchored at one end to the guide rail 156 and the opposite end attached to the free end of an arm 173 pivoted at the opposite end on a post 174 mounted on the table T adjacent a cut away portion 175 in the outer edge of the closure cap guide rail 93 to permit movement of the arm under the force of the spring 172 toward the closure cap supporting recesses 56 to engage a roller 176 rotatably carried by the arm 173 intermediate the ends thereof with the closure cap C in a predetermined recess 56 of the annular plate 57, in the present instance the sixth recess from the recess supporting a closure cap in vertical alinement below a sealing pad P on the transporting disk 124 as the opening 129 and recess 130 of the disk 124 positioned to receive a sealing pad from the delivery tube 95 are the sixth from the opening and recess positioning the sealing pad P in alinement with the closure cap in the supporting recess 56, as shown in Figure 12. The movements of the arm 173 are imparted to the jaws 161 through a link 177 pivotally connected at the opposite ends to the arm 173 and the screw 162 of the jaw lever 164 nearest the annular plate 57 whereby the jaws 161 under the influence of spring 172 normally engage the sealing pads extending below the outlet of the delivery tube 95 and prevent the discharge of sealing pads into the path of travel of the feeding slide 102, but said jaws are actuated by the passage of a closure cap relative to the roller 176 which cap will engage said roller and actuate the arm away from the annular plate 57 against the tension of spring 172 and move the jaws away from each other to permit the lowermost sealing pad of the stack in the tube 95 to be positioned on the plate 100 and delivered by the slide 102 to the pad transporting disk 124.

Figures 6, 7, 8:
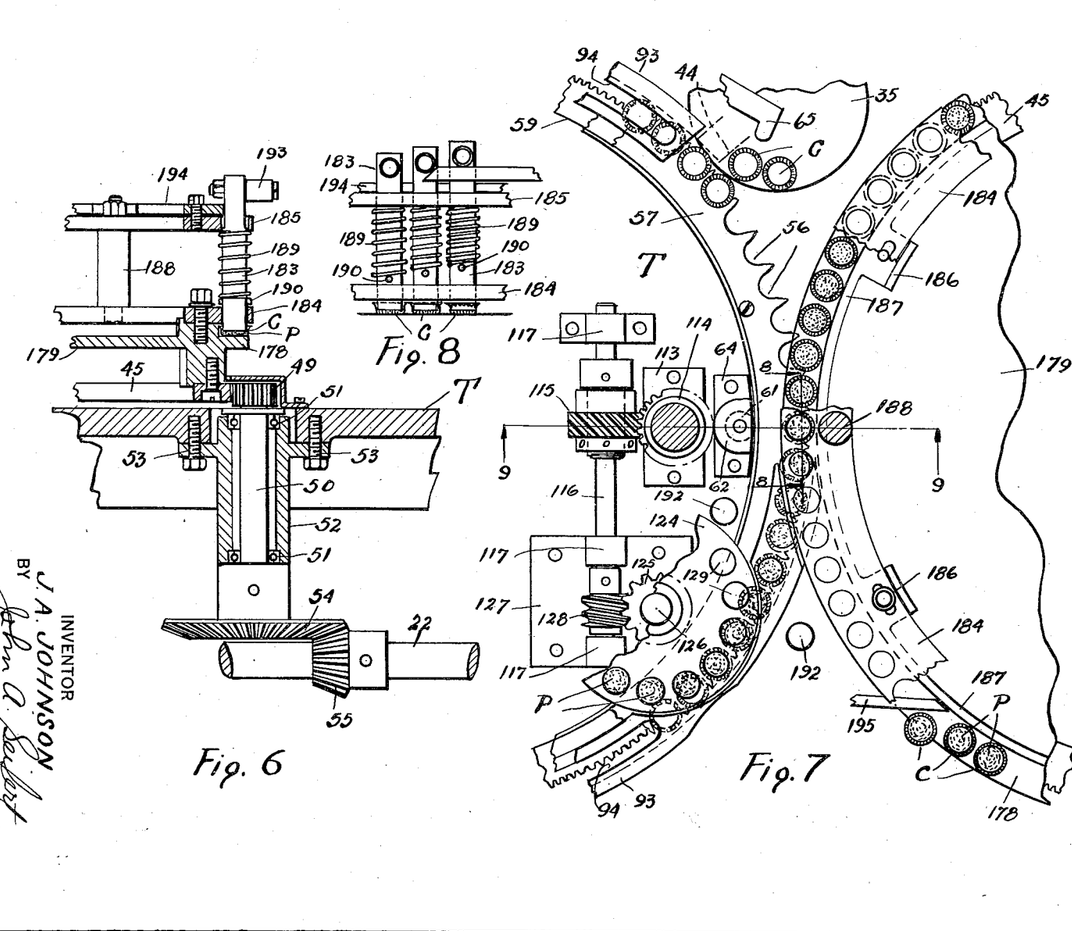
Figure 6 is a view, on an enlarged scale and in section taken substantially on the line 6—6 of Figure 2 looking in the direction of the arrows, showing the driving connection between the drive shaft and the pressure applying table.
Figure 7 is a fragmentary plan view of juxtaposed portions of the annulus and pressure applying table where the assembled caps are transferred from the annulus to said table, and the sealing pad supporting disk positioning a pad in alinement with and to be assembled in a cap in a pocket in the annulus with said disk being broken away to show actuating means therefor.
Figure 8 is a view, on the line 8—8 of Figure 7 looking in the direction of the arrows, of the spring influenced plungers of the pressure applying table and showing the plungers being actuated toward the caps on the pressure applying table.
Figure 9:
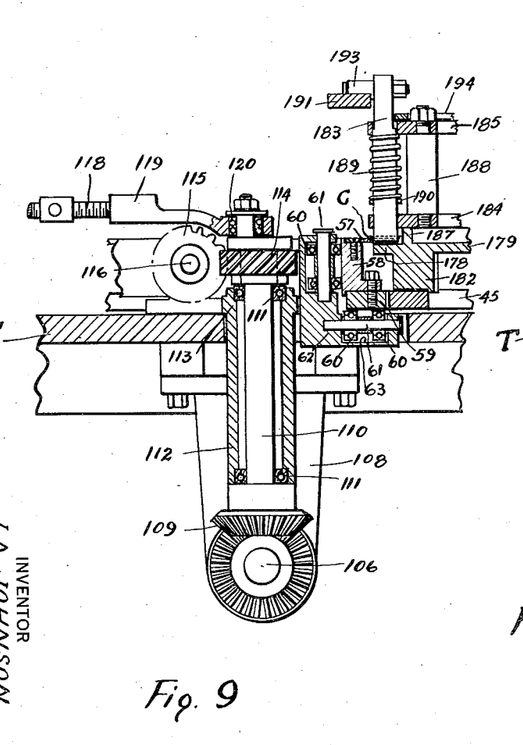
Figure 9 is a cross sectional view, on an enlarged scale, taken on the line 9—9 of Figure 7 looking in the direction of the arrows and showing actuating means for the sealing pad supporting disk, the slide for feeding sealing pads to said disk and the reciprocating means for engaging closure caps in the annulus pockets, and showing a plunger of the pressure applying table engaging a closure cap supported by a pocket of the annulus in relation to said table.

After a sealing pad P has been delivered to a closure cap C in the supporting recess 56 of the annular plate 57, the plunger 131 is actuated by the spring 141 from the closure cap to within the opening 140 in the disk 137 permitting the continual rotation of the plate 57 and positioning of the closure cap having the adhesively attached sealing pad relative to a laterally extending shelf 178 of an annular table 179 having an elongated boss 180 centrally thereof rotatably mounted and retained on a spindle 181 fixed in the table T, the table 179 being continuously rotated in synchronism with the closure cap transporting plate 57 by the meshing annular gears 45 and 59, and supported by a block 201 on the table T. Gear 45 is carried by the table 179 through equidistantly spaced lugs 182 integral with and extended downwardly from said table. As the closure cap positioned on the shelf 178 by the plate 57 is moved from said shelf by the rotation of the plate 57 a plunger of a series of plungers 183 is yieldingly engaged in said closure cap, said engagement impinging the closure cap to the shelf 178 and disengages the closure cap from the recess 56 by the rotation of the table 179 in a direction opposite to the direction of travel of plate 57, as indicated by the arrows in Figure 2. The plungers 183 are slidably mounted above the table shelf 178 and equidistantly spaced from each other to correspond with the recesses 56 in the plate 57, as clearly shown in Figures 2 and 7, by a pair of rings or annular members 184, 185, member 184 being supported and adjustably retained on lugs 186 extending laterally from an annular ridge 187 integral with the table 179 separating the table from the shelf 178 and forming an annular recess between the shelf and ring 184, as shown in Figures 3 and 9, with the annular member 185 supported by and in spaced relation above the other annular member 184 by a series of equidistantly spaced posts 188 having the opposite ends reduced with one end threaded into the member 184 and the other end engaged and releasably retained in the member 185 to permit removal and adjustment of the annular members. The plungers 183 are yieldingly engaged in the closure caps and maintained in impinging engagement with the sealing pads by a spring 189 coiled about each plunger with the lower end abutting the opposite projecting ends of a pin 190 engaged in the plungers adjacent the lower end thereof and the upper end of the spring impinging against the annular member 185, whereby the lower ends of the plungers are normally positioned below the annular member 184 to extend into the closure caps in impinging engagement with the sealing pads to assure an intimate adhesion between the sealing pads and closure caps. The sealing pads are maintained under pressure of the plungers for a greater portion of three-quarters of a revolution of the table 179 or until the closure caps are comparatively cool when the plungers 183 are lifted against the force of the springs 189 within the annular member 184 and out of the closure caps, as shown in Figure 3, to permit the closure caps having intimately adhering sealing pads to be removed from the table shelf 178 and the positioning of closure caps from the closure cap transporting plate 57 on the table shelf 178 in alinement with the lifted pressure applying plungers 183, by a cam rail 191 adjustably mounted on posts 192 mounted on the table T between the annular member 57 and table 179 and within the annular member 57, as shown in Figure 2, to extend along and above the periphery of the plunger carrying member 185 to engage rollers 193 rotatably mounted on the ends of the plungers 183 projecting above the member 185 to extend laterally thereof, as shown in Figures 1, 6 and 9, the cam terminating substantially in line with shaft 185 and spindle 181 and at a point prior to the discharge of the caps from the table shelf 178. To maintain the plungers in vertical alinement during the actuation thereof the portion of the plungers projecting above the annular member 185 engages a guide in the form of a ring 194 mounted on the member 185, as shown in Figures 6, 8 and 9.

After the closure caps have been completely assembled and the plungers 183 have been lifted by the cam rail 191 the closure caps are discharged from the table shelf 178 by a guide rail 195 having one end extended into the space between the table shelf 178 and plunger supporting member 184 and terminating adjacent the table ridge 187, as shown in Figures 2, 3 and 7, and mounted by brackets 196 on a plate 197 fixed to a spindle 198 fixed in the table T, an edge of the plate and guide rail forming an arcuate channel for the passage of the closure caps, as shown in Figure 2. The closure caps after being disengaged from the plungers 183 are moved along the guide rail 195 and the channel formed by said guide rail and supporting plate 197 by the rotation of the table 179 and a second table 199 rotatably mounted on the spindle 198 and actuated in synchronism with the table 179 by a gear 200 integral and rotatable with the table 199 meshing with the gear 45. The assembled closure caps are delivered to a conveyer belt (not shown) traveling parallelly of a side of the table T below a peripheral portion of the table 199 extending beyond said side of the table T by the closure caps being guided from said table 199 by the channel formed by the guide rail 195 and plate 197 extending in a straight path from a peripheral portion of the table 199 adjacent the side of the table T, as clearly shown in Figure 2.

Figures 25, 26, 27:
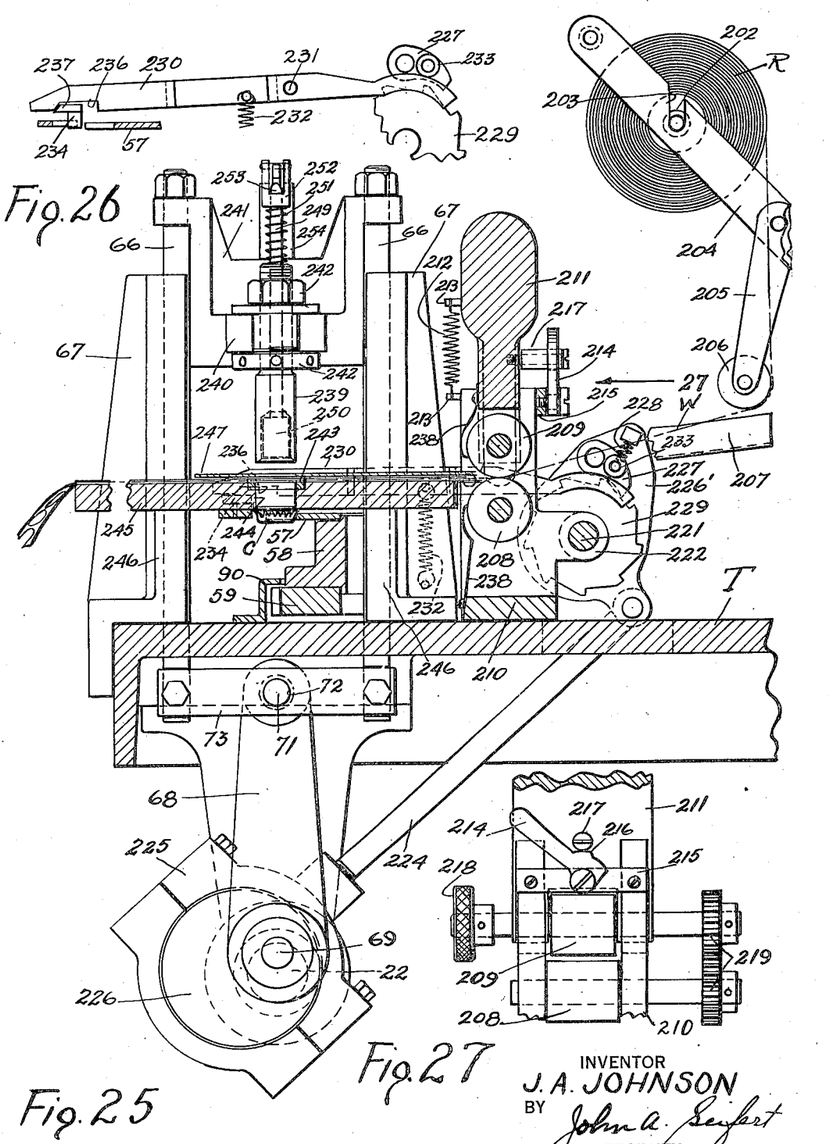
Figure 25 is a sectional view, on an enlarged scale, taken on the line 25—25 of Figure 22 looking in the direction of the arrows to show a closure cap being positioned to permit the feeding of a web of adhesive material to the punch and die mechanism.
Figure 26 is a fragmentary view of means to normally prevent the feeding of the web of adhesive material and adapted to be actuated by the travel of the closure caps to permit the feeding of the web.
Figure 27 is a fragmentary view looking at Figure 25 in the direction of arrow 27 showing a pair of rollers for intermittently feeding the web of adhesive material and means to actuate one roller toward and away from the other roller.

The adhesive supplied to the closure caps before they are passed through the zone of elevated temperature may be in the form of paper disks impregnated or coated with an adhesive in a non-viscous state severed from a web W supplied from a roll R thereof supported on a spool 202 rotatably mounted in alined slots 203 in a pair of parallel arms 204 supported by the table T in any suitable manner and having a frame 205 pivotally suspended therefrom with a roller 206 carried by the frame to take up the slack and guide the web to a channel shaped guide member 207 mounted on the table T to direct the web between a pair of superposed feed rollers 208, 209. Roller 208 is rotatably supported in a bifurcated bracket 210 mounted on the table T in spaced relation with the inner edge of the annulus 57 with the roller 209 carried in a bifurcated end of a weighted block 211 slidably mounted in the bifurcated leg portions of the bracket 210 to permit the positioning of the roller 209 away from the roller 208 to thread the web W between the feeding rollers. The roller 209 is yieldingly urged into web feeding engagement with the roller 208 by a spring 212 anchored at the opposite ends by pins 213 fixed in the bracket 210 and the block 211, and the roller 209 together with the supporting block 211 is actuated away from the roller 208 against the tension of the spring 212 by a lever 214 pivotally mounted on a bar 215 supported by the leg portions of the bifurcated bracket 210 and said lever 214 being arranged with a cam face 216 adjacent the pivotal mounting thereof adapted to engage a roller 217 rotatably carried by the block 211 whereby the movement of the free end of the lever in an upward direction toward the roller 217 will actuate the block in an upward direction to position the roller 209 in spaced relation with the roller and permit threading of the web W between the rollers, as shown in Figure 27. The threading of the web between the rollers is facilitated by rotating the roller 209 through a knurled knob 218 fixed to one end of the shaft of said roller projecting beyond the side of the block 211.

Figure 22:
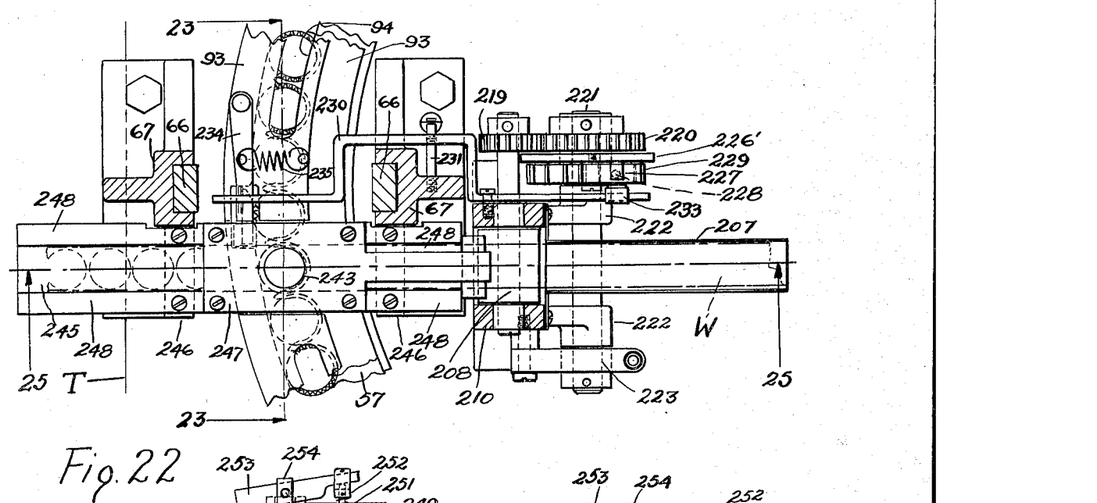
Figure 22 is a plan view of means for severing and applying a disk of adhesive material to closure caps carried by the annulus before the closure caps are passed through the zone of elevated temperature.

The rollers 208, 209 are intermittently rotated one from the other to feed a predetermined length of the web W by a pair of meshing pinions 219 fixed on the ends of the shafts of the rollers opposite to the end of the shaft of roller 209 having the knurled knob 218 and the pinion 219 on the shaft of roller 208 meshing with a gear 220 fixedly mounted on a shaft 221 rotatably supported in bearings 222 extending from the leg portions of bracket 210 and held against slack movement by tension brake mechanism of the usual structure, as shown at 223 in Figure 22. The shaft 221 is intermittently rotated in one direction from the drive shaft 22 by a reciprocating rod 224 releasably connected at one end to a strap 225 encircling an eccentric 226 mounted on the drive shaft 22 with the opposite end of the rod 224 extended through an elongated opening in the table T and pivotally connected to a plate 226' loosely mounted on the shaft 221 and carrying a pawl 227 yieldingly urged by a spring 228 to engage a ratchet wheel 229 fixedly mounted on the shaft 221, whereby the shaft 221, gear 220 and pinions 219 are actuated by the reciprocatory movement of the rod 224 toward the drive shaft 22.

To prevent the feeding of a predetermined length of web W when a closure cap is not in position to receive an adhesive disk the pawl 227 is normally positioned out of engagement with the ratchet wheel 229 against the tension of spring 228 by a lever 230 pivotally mounted at 231 to extend transversely of the path of movement of the closure caps having one end of arcuate shape and yieldingly urged by a spring 232 to engage a roller 233 carried by the pawl 227. The spring 232 will urge the opposite end of the lever 230 toward an arm 234 pivotally mounted at one end on the guide rail 93 having the opposite free end yieldingly uged by a spring 235 into the path of movement of the closure caps on the annulus 57 and into a cut out portion 236 in the lower edge of the lever 230 to permit the spring 232 to move the arcuate end of said lever 230 in an upward direction into engagement with the roller 233 of the pawl 227 and position the pawl out of engagement with the ratchet wheel 229, as shown in Figure 26. A closure cap travelling into position to receive an adhesive disk will engage the end of the arm 234 positioned in the path of said closure cap and said engagement moving said end of the arm 234 laterally out of the cut out portion 236 into engagement with the lower edge of the lever 230 thereby lowering the curved end of the lever 230 out of engagement with the roller 233 against the force of the spring 232 and permitting the pawl 227 to engage the ratchet wheel 229 under the influence of spring 228. To facilitate the actuation of the lever 230 by the arm 234, the free end of the arm 234 carries a block arranged with a cam edge to co-operate with a cam edge of the cut out portion 236, as at 237 in Figure 26.

To prevent an accumulation of adhesive on the web feed rollers 208, 209, there is provided scrapers in the form of resilient members 238 fixed at one end to the base of the bracket 210 and the block 211 with the free ends curved to engage the feed rollers, as shown in Figure 25.

The adhesive disks are severed from the web during the period of rest of the feed rollers 208, 209 by a punch and die mechanism mounted in alinement with the feed rollers and superposed to the path of movement of closure caps on the annulus 57 and comprising a tubular punch 239 adjustably mounted in a lateral extension 240 of a head 241 by retaining members 242 screw threaded on the punch in abutting relation with the opposite faces of the lateral extension 240. The head 241 is reciprocated toward and away from the closure caps on the annulus 57 by slide mechanism similar to the slide mechanism previously described and disclosed in Figures 4 and 5 for applying and spreading fluid adhesive in the closure caps and embodying a pair of slides 66 operatively mounted in a pair of opposed slideways 67 supported by the table T on opposite sides of the annulus 57. The slides are reciprocated from the drive shaft 22 by a crank arm 68 rotatably engaged at one end on a stud 69 fixed in and projecting from the eccentric 226, Figures 23 and 25, with the opposite end of the crank arm having a transverse pin 71 having reduced ends extending from the opposite sides of the arm to engage alined openings 72 intermediate the ends of a pair of opposed lever bars or links 73 having the opposite ends fixed to the opposite sides of the lower ends of the slides 66, as clearly shown in Figures 4, 5, 23 and 25.

The punch 239 co-operates with a die 243 having a diameter substantially the exterior diameter of the cutting head of punch 239 and the interior diameter of the bottom of the closure caps and supported in a corresponding opening 244 in a table 245 mounted on brackets 246 supported by the table T adjacent the slideways 67 extending from the web feed rollers 208, 209, to a point beyond the side of the table T to direct the waste portion of the web W to a suitable depository, not shown. The web W is supported and guided from the rollers 208, 209 to a position between the punch and die by a plate 247 mounted on the table 245 having at the opposite ends guide rails 248 at the opposite sides and an intermediate flat portion surrounding the die 243.

Figures 23, 24:
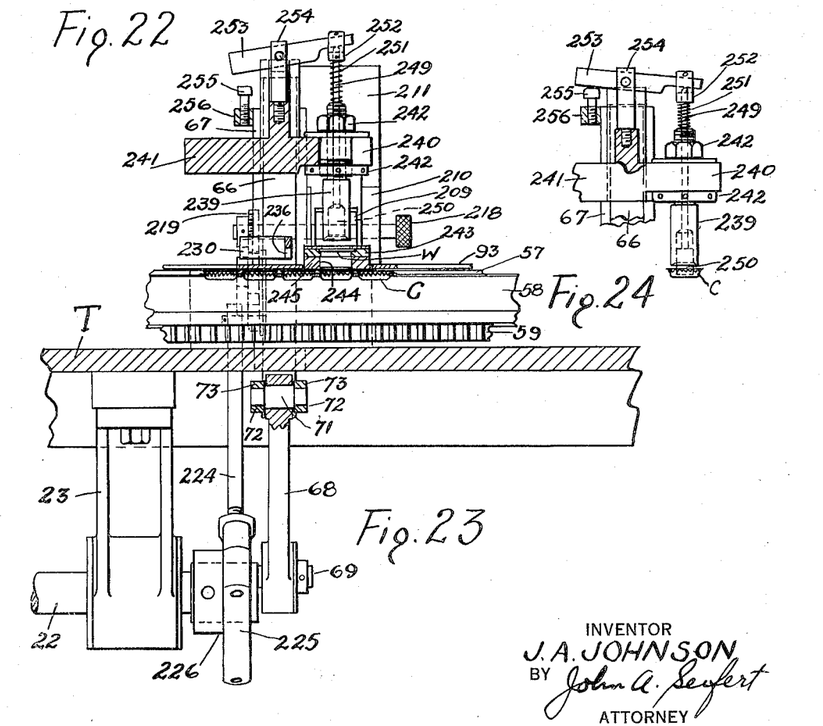
Figure 23 is a sectional view taken on the line 23—23 of Figure 22 looking in the direction of the arrows to show punch and die mechanism for severing and applying a disk of adhesive material to the closure caps.
Figure 24 is a fragmentary view of the punch showing a severed adhesive disk being positioned in a closure cap.

The undersurface of the table 245 is superposed to the closure caps, as shown in Figures 23 and 25, and at the terminus of the cutting stroke of the punch 239 the cutting head thereof is positioned within the opening 244 of the table with the severed disk of adhesive material also within said opening 244. To position the severed disk in the closure cap positioned below the table in registry with the opening 244, and in contact with the bottom of said closure cap, there is provided a plunger 249 slidably mounted in the bore of the tubular punch 239 having a head 250 normally positioned within the cutting head of the punch by a spring 251 coiled about a portion of the plunger 249 extending beyond the end of the punch opposite the cutting head and compressed between said end of the punch and a bifurcated head 252 fixed to the end of the plunger having connected thereto one end of a lever 253 pivotally mounted intermediate its ends in a bifurcated end of a post 254 fixed in a vertical portion of the head 241, as clearly shown in Figures 23 and 25. In the severing position of the punch 239 during the downward movement of the head 241 the end of the lever 253 opposite to the end connected to the plunger 249 will engage an adjustable abutment in the form of a set screw 255 screw threaded into a cross member 256 fixed at the opposite ends to the slideways 67. The engagement between the lever 253 and the set screw 255 will actuate the plunger head 250 beyond the cutting head of the punch to strip the severed disk from the punch head and the continued downward movement of the head 241 to the terminus of the cutting stroke of the punch will actuate the plunger head 250 into the closure cap and position the severed adhesive in contact with the bottom of the closure cap, as shown in Figure 24. The material of the severed disk is of sufficient tackiness to cause the severed disk to adhere to the closure cap and prevent the withdrawal thereof by the retraction of the plunger head. The heat of the zone of elevated temperature will render the adhesive disks in the closure caps thoroughly viscous to intimately adhere the sealing pads to the closure caps.

The end of the arm 234 having the cam block is normally positioned to engage a closure cap prior to the positioning of the same in registry with the punch and die so that should there be no closure cap being moved into registry with the punch and die the predetermined length of web will not be fed to the punch and die mechanism thereby preventing the severing of an adhesive disk and the interference of said disk with the travel of the annulus 57.

The pivot 231 for the lever 230 comprises a pin fixed in a slideway 67 and the intermediate portion of said lever 230 mounted on said pin is of U-shape to position the end portions thereof in alinement with the slideways 67 and in actuating position relative to the pawl roller 233 and the cam block end of arm 234.

Having thus described my invention I claim:

1. In apparatus for assembling sealing pads in closure caps, means to releasably support and transport the caps in an arc of a circle, means to deliver and engage caps on the cap transporting means, means to deposit a spot of adhesive and spread said spot of adhesive in the caps during the travel of the caps on the cap transporting means, means to heat the caps to remove the foreign substances from and render viscous the adhesive in the caps, means to support and transport sealing pads from a source of supply to position in vertical alinement with the travel of the caps having viscous adhesive therein, and means carried by the sealing pad transporting means to deliver pads from the pad transporting means into contact with the adhesive in the caps on the cap transporting means at the vertical alined position of the pads relative to the caps, and the cap transporting means moving the caps with the sealing pads assembled therein from the sealing pad transporting means.

2. In apparatus for assembling sealing pads in closure caps, a continuously rotating annular member having a series of cap supporting seats about a periphery thereof, means to feed and engage caps in the cap supporting seats, a rotatable disk having a series of orifices therein having their axes extending parallelly of the axis of rotation of the disk adapted to be positioned in alinement with the cap supporting seats of the annular member by the rotation of the disk, means to position sealing pads on the disk in register with the orifices therein, and means carried by the disk to deliver a sealing pad positioned on the disk through an orifice in the disk into a cap in a cap supporting seat when the disk orifice is in alinement with the cap supporting seat.

3. Apparatus for assembling sealing pads in closure caps as claimed in claim 2, wherein the means to position sealing pads on the disk comprises a slide reciprocatory toward and away from the disk.

4. Apparatus for assembling sealing pads in closure caps as claimed in claim 2, wherein the means to position the sealing pads on the disk in register with the disk orifices comprises a series of arcuate recesses extending about a peripheral portion of the disk orifices, and a reciprocatory slide to position the sealing pads in engagement with the recesses in register with the disk orifices.

5. In apparatus for assembling sealing pads in closure caps, an annular member rotatably supported and having a series of closure cap supporting seats about a periphery thereof, a pivoted reciprocatory member to position caps in said cap supporting seats, a disk rotatably mounted with a peripheral portion superposed to the annular member and having the periphery thereof arranged to receive sealing pads, means to deliver sealing pads to the disk, means carried by the disk to deliver sealing pads from the disk to the caps in the cap supporting seats traveling relative to the disk, and a table rotatable in synchronism with the annular member having a peripheral portion traveling below the cap supporting seats to engage the caps with sealing pads assembled therein to discharge the assembled caps from the apparatus.

6. In apparatus for assembling sealing pads in closure caps, a continuously rotatable annular member having a series of closure cap supporting seats in a periphery thereof, means to feed and engage caps in the cap supporting seats, a disk rotatably mounted with a peripheral portion superposed to the annular member and having a series of orifices extending through and about the periphery thereof adapted to be positioned in alinement with the cap supporting seats by the rotation of the disk, means to deliver sealing pads to the disk in register with the disk orifices, and a series of plungers carried by the disk in alinement and normally out of engagement with the orifices in the disk and adapted to be actuated in a direction parallelly of the axis of the disk into said disk orifices to deliver the sealing pads through the disk to the caps in the cap supporting seats when an individual orifice of the disk corresponds with a cap supporting seat.

7. In apparatus for assembling sealing pads in closure caps, a continuously rotating annular member having a series of closure cap supporting seats in a periphery thereof, means to feed and engage caps in the cap supporting seats, a disk rotatably mounted with a peripheral portion superposed to the annular member and having a series of orifices adapted to be individually positioned in register with a succeeding cap supporting seat by the rotation of the disk, means to feed sealing pads to the disk in register with the orifices in the disk, a series of plungers carried in superposed relation to the disk in alinement and normally out of engagement with the orifices in the disk to permit the feeding of the sealing pads in register with said orifices and below the plungers, and stationary means mounted in alinement with the point where an orifice in the disk is in register with a cap supporting seat to successively engage and actuate the plungers to deliver a sealing pad through a disk orifice into a cap in a cap supporting seat.

8. Apparatus for assembling sealing pads in closure caps as claimed in claim 7, wherein the plunger actuating means is adjustably mounted to permit variation in the movement of the plungers and corresponding positioning of the sealing pads in the caps.

9. In apparatus for assembling sealing pads in closure caps, a continuously rotating cap supporting annulus, a continuously revolving disk adjacent the cap supporting annulus to deliver closure caps relative to said annulus, means reciprocatory in an arc transversely of the disk to engage and transfer the closure caps from the disk to the cap supporting annulus, a second disk rotatably mounted above the annulus and arranged to support sealing pads about the periphery thereof to successively position sealing pads in vertical alinement with succeeding caps on the annulus, means reciprocatory toward and away from the second disk to deliver sealing pads to said second disk, means carried by said second disk to deliver the sealing pads from the second disk into the caps on the annulus, a continuously rotatable table having a peripheral portion extending below and engaging caps with sealing pads therein on the annulus, means carried by the table adapted to engage the sealing pads in the caps on the annulus and transfer the caps from the annulus to the table by the rotation of the table, a second table rotatably mounted adjacent the annulus and first table, and means to engage the assembled caps on the first table and direct said caps onto the second table for discharge from the apparatus.

10. Apparatus for assembling sealing pads in closure caps as claimed in claim 9, wherein the first disk for delivering closure caps to the annulus and the first table for receiving closure caps from the annulus are rotated in one direction, and the annulus, the second disk for supporting the sealing pads and the second table for receiving assembled caps from the first table are rotated in the opposite direction.

11. Apparatus for assembling sealing pads in closure caps as claimed in claim 5, wherein the annular member is rotatably supported by a plurality of equidistantly spaced bearing supports comprising pairs of rollers extending at a right angle to each other to engage the bottom and a side of the annular member.

12. In apparatus for assembling sealing pads in closure caps, a continuously rotating annular member having a series of closure cap supporting recesses in a periphery thereof, means to deliver and engage closure caps into the recesses in the annular member, a slide reciprocatory in a plane extending perpendicularly to the annular member and having a head extending parallelly of the annular member with opposite portions thereof extending in alinement with spaced recesses of the annular member, an adhesive discharge device carried by one of said opposite portions of the slide head to deposit a spot of adhesive in a cap engaged in a recess alined with said head portion, a plunger carried by the other of said opposite portions of the slide head to engage and evenly spread the adhesive in a closure cap alined with the head portion carrying the plunger, means to support and position a sealing pad in alinement with a closure cap having adhesive spread therein on the annular member, means carried by the sealing pad supporting means to deliver a sealing pad from the sealing pad supporting means into contact with the adhesive in a closure cap on the annular member alined with the sealing pad during the travel of the annular member and the sealing pad supporting means, and means to remove the closure caps having sealing pads therein from the annular member and place the sealing pads under pressure to cause the sealing pads to adhere intimately to the closure caps.

13. In apparatus for assembling sealing pads in closure caps, an annular member rotatably supported and having a series of arcuate recesses, means to deliver and engage closure caps into the arcuate recesses, a disk rotatably mounted in superposed relation to the annular member and arranged to support sealing pads about the periphery thereof to successively position said sealing pads in alinement with succeeding arcuate recesses, a shelf extending adjacent the disk, a tube mounted in spaced relation to the shelf to support sealing pads in stack formation with the lowermost pad supported by the shelf, a slide reciprocatory on the shelf in a direction toward and away from the disk to feed the lowermost sealing pad in the tube to the disk, a pair of jaws movable and yieldingly urged toward each other to normally engage opposite edge portions of the sealing pads above the slide and adapted to be actuated out of engagement of said sealing pads by closure caps in the arcuate recesses traveling toward the sealing pad supporting disk to permit feeding of sealing pads to the disk, and means carried by the sealing pad supporting disk to deliver sealing pads into the closure caps in the arcuate recesses positioned in alinement with the sealing pads supported by the disc.

14. Apparatus for assembling sealing pads in closure caps as claimed in claim 13, wherein the sealing pad engaging jaws comprises a pair of bell crank levers pivotally connected at one end and the opposite ends arranged with jaws, and the jaw end of one of said levers being yieldingly urged toward the jaw end of the other lever to engage the jaws with the sealing pads.

15. Apparatus for assembling sealing pads in closure caps as claimed in claim 13, wherein the sealing pad engaging jaws adapted to be actuated by the closure caps in the arcuate recesses comprises an arm pivotally mounted adjacent the path of travel of the arcuate recesses and yieldingly urged toward said recesses to engage the closure caps therein, and a pair of bell crank levers pivotally connected at one end to each other with the opposite ends of said levers arranged with jaws and the jaw end of one of said levers being connected to the pivoted arm whereby the jaws are actuated toward and away from stacked sealing pads by the absence or presence of a cap in an arcuate recess.

16. In apparatus for assembling sealing pads in closure caps, a continuously rotatable annular member having closure cap supporting recesses about a periphery thereof, a disk rotatably mounted with a peripheral portion superposed to the annular member and arranged to support sealing pads about the periphery thereof to successively position the sealing pads in alinement with succeeding closure cap supporting recesses, means to engage closure caps in the closure cap supporting recesses and simultaneously feed sealing pads to the sealing pad supporting disk, and means carried by the sealing pad supporting disk operative by the rotation of the disk to engage and deliver sealing pads from said disk to the closure caps in the alined closure cap supporting recesses.

17. In apparatus for assembling sealing pads in closure caps, means to releasably support and transport the closure caps in an arc of a circle, means to deliver and engage the closure caps on the transporting means, means to deliver and position a disk of adhesive material in the closure caps in contact with the bottoms of the closure caps during the travel of the closure caps on the closure cap transporting means, means to heat the closure caps to render viscous the adhesive disks in the closure caps, means to support and transport sealing pads from a source of supply to position in vertical alinement with the travel of the closure caps having viscous adhesive disks therein, and means carried by the sealing pad transporting means to deliver pads from the sealing pad transporting means into contact with the viscous adhesive disks in the closure caps on the closure cap transporting means at the vertical alined position of the pads relative to the closure caps, and the closure cap transporting means moving the closure caps with the sealing pads assembled therein from the sealing pad transporting means.

18. In apparatus for assembling sealing pads in closure caps, means to releasably support and transport the closure caps in an arc of a circle, means to deliver and engage the closure caps on the transporting means, means to feed a web of adhesive material transversely of the path of travel of the closure caps, means to sever disks from the adhesive web and position the severed disks in the closure caps during the travel thereof on the transporting means, means to heat the closure caps to render viscous the adhesive disks in the caps, means to support and transport sealing pads from a source of supply to position in vertical alinement with the travel of the closure caps having viscous adhesive disks therein, and means carried by the sealing pad transporting means to deliver pads from the sealing pad transporting means into contact with the viscous adhesive disks in the closure caps on the closure cap transporting means at the vertical alined position of the pads relative to the closure caps, and the closure cap transporting means moving the closure caps with the sealing pads assembled therein from the sealing pad transporting means.

19. In apparatus for assembling sealing pads in closure caps, closure caps transporting means, a disk rotatably mounted in superposed relation to the caps on the transporting means and arranged to support sealing pads about the periphery thereof to successively position sealing pads in alinement with succeeding caps on the transporting means, a tube mounted adjacent the periphery of the disk, a slide reciprocatory mounted below the tube to have movement in a direction toward and away from the disk to feed the lowermost sealing pad in the tube to the disk, a pair of jaws movable toward each other to normally engage opposite edge portions of the sealing pads above the slide, means connected to the jaws and yieldingly urged to be engaged by the caps on the transporting means and actuate the jaws out of engagement with the sealing pads to permit feeding of sealing pads to the disk, and means carried by the sealing pad supporting disk to deliver sealing pads into the alined closure caps on the transporting means.

20. Apparatus for assembling sealing pads in closure caps as claimed in claim 19, wherein the means connected to the jaws comprises an arm pivotally mounted adjacent the cap transporting means to have movement toward and away from the caps on the transporting means.

21. Apparatus for assembling sealing pads in closure caps, as claimed in claim 2, wherein the orifices are tapered from the upper face of the disk.

JOHN A. JOHNSON.